United States Patent [19]
Hoffart et al.

[11] Patent Number: 5,796,905
[45] Date of Patent: Aug. 18, 1998

[54] OPTICAL FIBER WITH A COLOR MARKING

[75] Inventors: Michael Hoffart, Heiligenhaus; Jürgen Rosenkranz, Mönchengladbach; Franz-Peter Bartling, Düsseldorf; Bertram Glessner, Mönchengladbach; Hans-Jürgen Lysson, Korschrenbroich, all of Germany

[73] Assignee: Kabel Rheydt Aktiengesellschaft, Germany

[21] Appl. No.: 663,287

[22] PCT Filed: Dec. 20, 1994

[86] PCT No.: PCT/EP94/04241

§ 371 Date: Jul. 29, 1996

§ 102(e) Date: Jul. 29, 1996

[87] PCT Pub. No.: WO95/17695

PCT Pub. Date: Jun. 29, 1995

[30] Foreign Application Priority Data

Dec. 23, 1993 [DE] Germany .......... 43 44 223.4
Mar. 5, 1994 [DE] Germany .......... 44 07 406.9

[51] Int. Cl.⁶ .......... G02B 6/22
[52] U.S. Cl. .......... 385/128; 385/102
[58] Field of Search .......... 385/128, 901, 385/100–114

[56] References Cited

U.S. PATENT DOCUMENTS

| 5,146,529 | 9/1992 | Mizutani | 385/103 |
| 5,333,228 | 7/1994 | Kingstone | 385/100 |
| 5,345,531 | 9/1994 | Keplinger et al. | 385/102 |
| 5,379,363 | 1/1995 | Bonicel et al. | 385/114 |
| 5,485,539 | 1/1996 | Mills | 385/114 |

OTHER PUBLICATIONS

Japanese Abstract 57 040203 (Appln. JP800114842 800822); Mar. 1982; Yasunari.

*Primary Examiner*—John Ngo
*Attorney, Agent, or Firm*—Ware, Fressola, Van der Sluys & Adolphson LLP

[57] ABSTRACT

In an optical fiber (1) with a coating (8) for the cladding of one or more plastic layers containing the fiber core and a color marking (3) on or in the outer plastic layer, the color marking (3) is covered by a further transparent or translucent layer (4).

25 Claims, 2 Drawing Sheets

OPTICAL FIBER WITH A COLOR MARKING

BACKGROUND OF THE INVENTION

1. Techincal Field

The present invention concerns an optical fiber with a coating for the cladding made of several plastic layers, which surrounds the fiber core, and a color marking on or in the outer plastic layer.

2. Description of the Prior Art

Fibers of this generic type have been known for some time. For color marking and thereby keeping the conductors separate during splicing or connecting, a ring-shaped marking is applied to the outer plastic coating of the conductor, for example by using infrared radiation which hardens the curable plastics, but colored plastic dash or line markings are also used, which are hardened by applying ultraviolet radiation (UV). Since the color-marked fibers require further processing, for example when they are implanted into electrical or optical cables, or into protective tubes made of plastic or steel, or to manufacture fiber ribbons made with these fibers, the usual color markings of today, for example with an IR ring-shaped marking, do not always satisfy the present requirements, for example with respect to wear resistance. Because of the nonhomogeneous rough fiber surface caused by the known ring-shaped marking, there can always be problems when the fiber is processed further; also, an increase in attenuation can often not be avoided when the temperature in the optical transmission path changes. But a simple dash or line marking can have its drawbacks as well since, aside from the increase in technical effort, such color markings are often difficult to distinguish.

If cables with a higher number of fibers, for example more than 12, are used because of the increasing need for optical transmission paths, the precise identification of the fibers being used already produces difficulties because not enough different distinguishable colors are available. This applies equally to optical fibers made of glass, e.g. quartz glass, and to the plastic fibers used increasingly today for certain transmission paths.

SUMMARY OF THE INVENTION

Starting from this state of the art, it is an object of the invention to ensure a precise identification of any number of fibers, and beyond that to ensure that the color markings applied during the manufacturing process remain, regardless of subsequent further processing steps. The transmission properties of the fibers must not be influenced by the chosen color markings during temperature changes.

This task object is fulfilled according to the invention in that the color marking is covered by a further transparent or translucent layer. This ensures for example that a color marking of applied rings is not worn off from the fiber surface, or from the surface of the coating surrounding the fibers, during further processing.

Special advantages are obtained by further development of the invention, in that the further layer extends along the entire fiber length. It also ensures the protection of the color marking against mechanical wear; the smooth surface protection with comparable outer diameters ensures further processing of the marked fiber without any problems. The corresponding selection of materials needed for the further layer provide it with high strength, which on the other hand means that the often unavoidable increase in mechanical strains due to further processing of the fiber does not impair the optical properties of the optical fiber; to the contrary, an improvement of the transmission characteristics can be seen. In addition, the corresponding selection of materials allows the further layer to be used as an additional protection against moisture and solvents, which means that other application areas in optical transmission technology can be reached with a fiber constructed according to the invention. Since each color marking is mechanically protected by the translucent or transparent further layer of the invention immediately after the fiber is produced, i.e. before any further processing of the optical fiber, any color combination and/or any marking configurations can also be securely applied to the fiber according to the invention, for any desired application purposes.

Since the further layer covering the color marking, which is used for later identification of each individual fiber, must be made of a transparent or translucent material, it may be useful to use clear resin for the purpose of the invention.

If the further layer is colored, another particularly advantageous variation of the invention is to make it with a colored resin for example. This results in a multitude of further color combinations when the invention is used.

Resins that are suitable for the purposes of the invention are for example those based on polyamide, polyester, polyether, polysulfone or polyurethane. The resins may be those that can be hardened by means of infrared radiation, which have found use in the technology as so-called IR-resins; however, it is especially advantageous to use resins that can be hardened by ultraviolet radiation, which are so-called UV-resins that have a higher viscosity than IR-resins and are therefore particularly suited to make the further layer uniform, because of the color marking applied under it and over the coated fiber.

In addition to a secure and permanent color marking, by stabilizing the optical fiber equipped with the further layer against mechanical forces acting from the outside, and by simultaneously protecting it also against moisture, acids and such, the purposes of the invention are also served by selecting the thickness of the further layer from an order of magnitude of 1–10 µm, preferably 3–6 µm.

Another significant advantage of a fiber according to the invention can be found in that practically any desired color and configuration of the marking can be selected for placement underneath the further layer. If, as is usual today, ring-shaped markings, perhaps single or double rings, are applied to the fiber covered by the so-called coating, the application of this color marking is placed either directly on the outer coating layer, or on a uniform fiber coloring which covers the coating. This possibility already offers a multitude of variations of the colored marking. Thus for example, the ring-shaped marking of a fiber can contain rings of the same color, which are spaced differently with respect to each other along the fiber, or the ring-shaped marking of a fiber can contain rings of different colors. Another advantageous possibility is that the ring-shaped marking of a fiber is composed of rings of the same or different colors, which are uniformly spaced along the fiber. Of course, it is also possible and advantageous if the ring-shaped marking of a fiber contains a combination of different spaces and different colors, especially when a large number of fibers in an optical cable must be kept precisely separated.

Particularly if the further layer surrounds the fiber as an end-to-end protective layer, it is important to choose a thickness for this colored layer forming the ring-shaped marking, which is suitable for the purposes of the invention. The thickness of the colored layer forming the ring-shaped marking is therefore 0.5–5 µm, preferably 1–3 µm.

3

As already explained, any configurations of markings are possible on the fiber surface or on the coating forming the surface of the fiber, therefore a dash or line marking can be applied instead of the ring-shaped marking, or according to another idea of the invention, it can be integrated into the outer layer of this coating. In that case, it could also be advantageous to apply an additional dash or line marking to a fiber that already has a different color, or even apply a different combination of colors.

If the color marking is applied to the surface in similar form as the ring-shaped marking, or if the color marking is more or less integrated into the surface located underneath, the further layer of the invention ensures in all cases that the color marking is permanent and can be identified at any time.

Regarding the material of the color marking itself, an IR-curable resin is used for example, but it is also advantageous to use so-called UV-curable resins instead of the IR-curable resins for the color marking.

DETAILED DESCRIPTION OF THE INVENTION

Figure 1:
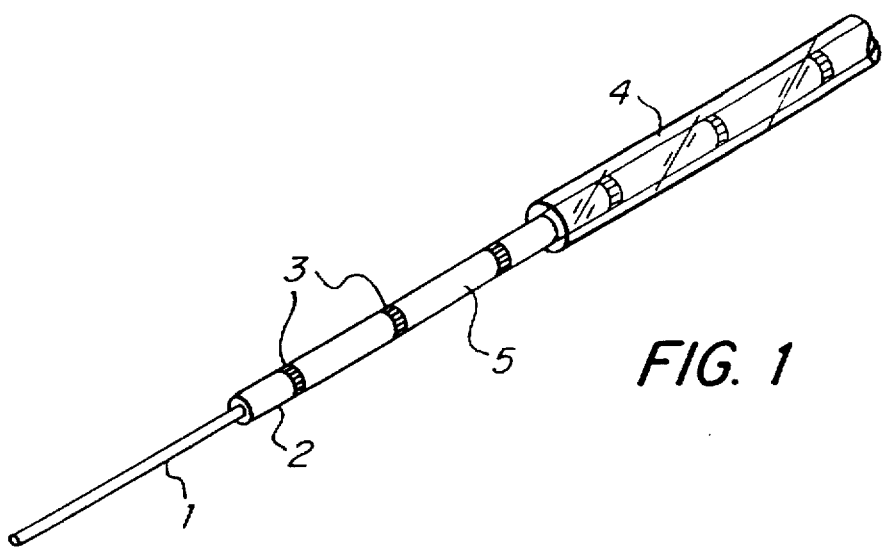
FIGS. 1–3 are perspective views of three different optical fibers with color markings made in accordance with the present invention and provided with cut-away portions to illustrate internal structure.

The optical fiber 1 illustrated in FIG. 1, with fiber core and cladding made of quartz glass e.g., has the so-called coating 2, which is composed of one or more plastic coatings to protect the fiber 1. A color marking in the form of spaced colored rings 3 is placed directly on this coating 2, the material of which is an IR- or UV-curable resin. The thickness of the colored rings in the configuration example is 3–4 µm, which is the distance surface of the colored rings 3 from the surface of the coating 2, so that mechanical wear of the colored rings must be anticipated when this fiber is processed further. To prevent this in a reliable manner, the invention provides a further transparent or translucent layer 4, which covers the entire length of the color-identified fiber. The material of this further layer 4 is for example a UV-curable polyamide- or polyurethane-based resin, which fills the area 5 between each two colored rings, as well as providing a cover on the colored rings 3. With the assumed 3 µm thickness of the colored rings 3, the thickness of the further layer 4 is 5 µm for example, so that all colored rings 3 are covered and the areas 5 between each two colored rings 3 are filled by the material of the further layer. This achieves a continuous protection of the color marking.

In the illustrated configuration example, the colored rings 3 have the same distance, but these distances can of course be varied, and the color marking in the form of colored rings 3 can also be applied to an already colored fiber.

Further color variations, and thereby further distinguishing possibilities, are provided if the further layer 4 according to the invention is colored or dyed, for example if it is made of a colored resin. For example, black or blue single or double rings 3 made of an IR-curable resin can be covered by a yellow, red, blue or green-dyed, preferably UV-curable resin layer 4, which has a higher viscosity. The colored single or double rings 3 can be easily identified, since the further colored layer 4 according to the invention is at least translucent. The selection of contrasting color combinations makes the marked fiber more identifiable.

Figure 2:
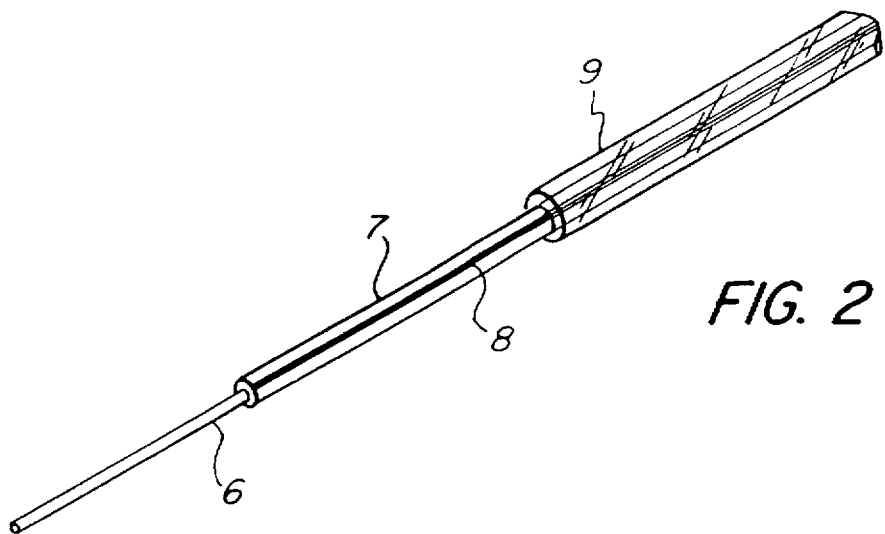

Deviating from FIG. 1, FIG. 2 illustrates a fiber 6 made of glass or plastic, which is covered by a coating 7 that in turn contains the color marking. This color marking comprises lengthwise running dashes or lines 8 of any color, where this marking is either applied directly to the coating 7 as illustrated, or is applied thereto if a uniform lengthwise extending color marking, which itself is colored, is applied to the coating 7. Like the colored rings in FIG. 1, the dash or line markings 8 can contrast against the surface of the plastic used for the coating 7, but the dashes or lines 8 can also be integrated into the plastic material. In all instances, the further layer 9, made of a polyester- or polyether-based resin for example, is provided to protect the color marking, and for the purpose of precisely distinguishing between the multitude of optical fibers in cables by means of any marking configurations. This resin can either be a clear resin or, as already explained by means of FIG. 1, a translucent colored resin.

Figure 3:
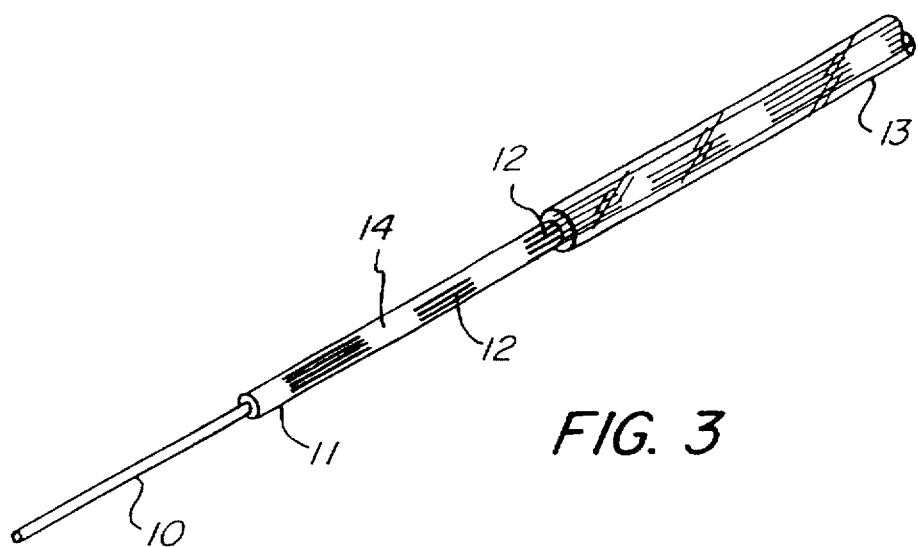

FIG. 3 illustrates another embodiment of the invention, wherein the optical fiber 10, which again can be made of glass or plastic, is surrounded by the so-called coating 11, specifically a "coating" in the case of glass fibers, to which the color marking is applied directly, or over an intermediate layer which is colored throughout. In the illustrated embodiment, it comprises spaced dashes or lines 12, possibly of different lengths that are also repeated periodically, which have a defined thickness and thereby extend beyond the coating 11. These broken dashes or lines, possibly at different distances from each other, are covered by the further layer 13, which covers the entire optical fiber and thereby securely protects the dashes or lines 12 against wear. To ensure a uniform course of the resin used for the further layer during the manufacturing process, a UV-curable resin, for example one based on polysulfone or polyurethane is used, which fills the interstices 14 between every two dashes or lines 12, and above all ensures that the color marking remains in the applied form, i.e. as a clear marking with sharp edge areas.

Another differentiation of fibers marked in this manner is provided, if the further layer 13 is made of a translucent resin, the color of which can be distinguished from the colors or color combinations located underneath.

What is claimed is:

1. An optical fiber comprising:
   (a) a fiber core;
   (b) a cladding surrounding the fiber core;
   (c) a coating made of at least one plastic layer surrounding the cladding;
   (d) a color marking joined with the coating; and
   (e) a further layer extending continuously along the full length of the fiber and covering the color marking, the further layer is colored and made substantially solely from a material which permits transmission of rays of light so the color marking can be seen therethrough.

2. An optical fiber as claimed in claim 1, wherein the further layer also covers the coating.

3. An optical fiber as claimed in claim 1, wherein the further layer is transparent.

4. An optical fiber as claimed in claim 1, wherein the further layer is translucent.

5. An optical fiber as claimed in claim 1, wherein the further layer is made of a colored resin.

6. An optical fiber as claimed in claim 1, wherein the further layer has a thickness in a range of from 1 to 10 µm.

7. An optical fiber as claimed in claim 6, wherein the further layer has a thickness in a range of from 3 to 6 µm.

8. An optical fiber as claimed in claim 1, wherein the further layer is made from a UV-curable resin.

9. An optical fiber as claimed in claim 1, wherein the further layer is made from an IR-curable resin.

10. An optical fiber as claimed in claim 1, wherein the further layer is made from a material chosen from a group consisting of polyamide, polyester, polyether, polysulfone and polyurethane.

11. An optical fiber as claimed in claim 1, the color marking is made from an IR-curable resin and the further layer is made from a UV-curable resin.

12. An optical fiber as claimed in claim 1, wherein the color marking is applied as an additional marking to an already colored fiber.

13. An optical fiber as claimed in claim 1, wherein the color marking has a thickness in a range of from 0.5 to 5 μm.

14. An optical fiber as claimed in claim 13, wherein the color marking has a thickness in a range of from 1 to 3 μm.

15. An optical fiber as claimed in claim 1, wherein the color marking is a ring-shaped marking.

16. An optical fiber as claimed in claim 15, wherein the ring-shaped marking is a plurality of same color rings, which are spaced differently from each other along the length of the fiber.

17. An optical fiber as claimed in claim 15, wherein the ring-shaped marking is a plurality of different color rings.

18. An optical fiber as claimed in claim 15, wherein the ring-shaped marking is a plurality of color rings, which are equally spaced along the length of the fiber.

19. An optical fiber as claimed in claim 15, wherein the ring-shaped marking is a plurality of different colored rings, which are spaced differently along the length of the fiber.

20. An optical fiber as claimed in claim 1, wherein the color marking is chosen from a group consisting of dash and line markings.

21. An optical fiber as claimed in claim 1, wherein the color marking is integrated into an outermost plastic layer of the coating.

22. An optical fiber as claimed in claim 1, wherein the color marking is made from an IR-curable resin.

23. An optical fiber as claimed in claim 1, wherein the color marking is made from a UV-curable resin.

24. An optical fiber as claimed in claim 1, wherein the fiber core is made of glass.

25. An optical fiber as claimed in claim 1, wherein the fiber core is made of plastic.

* * * * *

UNITED STATES PATENT AND TRADEMARK OFFICE
CERTIFICATE OF CORRECTION

PATENT NO. : 5,796,905
DATED : August 18, 1998
INVENTOR(S) : Michael Hoffart et al It is certified that error appears in the above-identified patent and that said Letters Patent is hereby corrected as shown below:

On the title page: Item [56] Referenced Cited:   insert:

--Foreign Patent Documents

| | | |
|---|---|---|
| 436221 | 07/1991 | EUROPEAN PATENT OFFICE |
| 581680 | 02/1994 | EUROPEAN PATENT OFFICE |
| 2648270 | 12/1990 | FRANCE |
| 562259 | 02/1994 | FRANCE |
| 3427835 | 06/1986 | GERMANY |
| 3636268 | 04/1988 | GERMANY-- |

Signed and Sealed this

Seventeenth Day of August, 1999

Attest:

Q. TODD DICKINSON

*Attesting Officer*           Acting Commissioner of Patents and Trademarks